United States Patent
Matousek et al.

(10) Patent No.: US 6,598,812 B1
(45) Date of Patent: Jul. 29, 2003

(54) CROP RESIDUE SPREADER FOR AN AGRICULTURAL COMBINE

(75) Inventors: Robert A. Matousek, Milan, IL (US); Joshua J. Wolters, Genesco, IL (US); Jason M. Benes, Grand Island, NE (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/359,313

(22) Filed: Feb. 7, 2003

Related U.S. Application Data

(62) Division of application No. 10/178,655, filed on Jun. 25, 2002.

(51) Int. Cl.⁷ .................................................. A01C 17/00
(52) U.S. Cl. ....................... 239/682; 239/650; 239/672; 239/687
(58) Field of Search ................................. 239/650, 663, 239/667, 672, 681, 682, 687, 688, 518, 523

(56) References Cited

U.S. PATENT DOCUMENTS 5,927,617 A * 7/1999 Musso et al. ............... 239/681
6,209,808 B1 * 4/2001 Anderson .................... 239/682
6,347,753 B1 * 2/2002 Anderson .................... 239/687

* cited by examiner

Primary Examiner—Steven J. Ganey
(74) Attorney, Agent, or Firm—John William Stader; A. Nicholas Trausch; Rebecca L. Henkel

(57) ABSTRACT

A crop residue spreader for an agricultural combine including a unique support element which is an elongate tube, including a center portion and a pair of legs extending outwardly in opposite directions from the center portion, each of the legs including an end portion opposite the center portion and an intermediate portion. The end portions include pivot elements coaxially aligned about a pivotal axis for pivotal connection to a rear end of the combine for movement between spreading and non-spreading positions. The intermediate portions include mounting elements for supporting rotatable crop accelerators in side-by-side relation, and the center portion includes at least one mount for mounting a pair of crop residue deflectors in cantilever relation to the tube and extending partially around the crop residue accelerators, respectively. The tube can also include mounts or supports for holding a shield in desired relation to the crop residue accelerators.

15 Claims, 8 Drawing Sheets

CROP RESIDUE SPREADER FOR AN AGRICULTURAL COMBINE

This is a divisional of co-pending application Ser. No. 10/178,655 filed on June 25, 2002.

TECHNICAL FIELD

This invention relates generally to a rotary crop residue spreader for an agricultural combine, and more particularly, to a spreader which utilizes a pivotally mounted elongate tubular support element for supporting at least one rotary crop residue accelerator and a crop residue deflector in cantilever relation to the accelerator, the spreader being positionable in at least one spreading position for receiving a flow of crop residue discharged from a rearwardly facing opening of the combine and accelerating and discharging it over a swath of an agricultural field, and at least one alternate position wherein the spreader is located such that at least a substantial portion of the residue flow from the combine will bypass or not be spread by the spreader for deposition on the field in windrows and which alternative position provides easier access to rear areas within the combine.

BACKGROUND ART

Currently, combines and some other harvesting machines typically include a straw chopper and/or straw spreader for disposing of straw separated from the harvested crop by the threshing mechanism onto the crop field. In addition, some combines have a chaff spreader for spreading the chaff separated from the grain by the cleaning apparatus or system. In some combines, the straw and chaff spreading functions are performed by a single spreader. Reference, Matousek et al. U.S. Pat. No. 5,797,793, issued Aug. 25, 1998, to Case Corporation; and Aubry et al. U.S. Pat. No. 6,238,286, issued May 29, 2001 to Deere & Company, which patents disclose vertical and horizontal crop residue spreaders, respectively, operable for performing assorted of the above-described spreading functions.

Often, when harvesting corn, it is desirable to spread the corn cobs, which are separated from the crop by the threshing mechanism and thus are part of the straw, evenly over the field. However, it is well known that the knives or blades of straw choppers can be more quickly dulled and more often broken by handling corn cobs, due to their large size and tough composition. As a result, while it is desirable to have the capability to spread tough crop residue such as corn cobs evenly over a combine's swath, it may also be desirable to do so without chopping the cobs. As a spreader, it is desirable to utilize apparatus which does not clog, bunch or require cleaning. Additionally, when spreading, it is most desired to do so evenly, that is, to spread the crop residue uniformly over the swath of the combine, including the center of the swath directly behind the combine. This can be accomplished by allowing some of the crop residue to fall through or bypass the spreader so as to land on the ground under the spreader, but a problem that has been observed is that this crop residue can bunch up and fall as clumps onto the field, instead of being spread evenly. Also, crop residue entering the spreader can become jammed or caught in crevices and bend over edges, called "hairpinning", so as to require periodic manual removal.

As another capability, it is desirable for a crop residue spreader to be positionable in a nonspreading position such that crop residue can exit the combine and form a narrow windrow on the field behind the combine.

Additionally, from time to time, the combine's threshing mechanism which separates the grain from straw and stalks, and the cleaning system which separates the grain from the pods and husks, require cleaning, adjustment, and/or maintenance which requires access thereto. Crop residue spreaders are typically mounted on the rear end of a combine in position for receiving a flow of crop residue from a rearwardly facing opening rearwardly of the cleaning system, and/or straw discharged through a downwardly or rearwardly facing space above the rearwardly facing opening. This location can make it difficult and time consuming to access aspects of the threshing and cleaning systems. In some instances, such access even requires removing the spreader and/or chopper.

Thus, what is sought is an improved crop residue spreader positionable in at least one operational or spreading position wherein straw, stalks, cobs, as well as chaff can be spread thereby; at least one position wherein straw can be windrowed; and at least one position wherein easy and convenient access to the threshing and cleaning apparatus of the combine is provided, the spreader and/or chopper being easily movable between the various positions, and lockable in at least one of the spreading positions. It is also sought to provide a spreader which is simpler to construct, yet is strong and robust, and provides an even spreading capability, and which is less likely to become clogged and/or drop undesired clumps of crop residue onto a field.

SUMMARY OF THE INVENTION

According to one preferred aspect of the invention, a support for a crop residue spreader for an agricultural combine is disclosed. The support utilizes an elongate tube, preferably of unitary construction, including a center portion and a pair of legs extending outwardly in opposite directions from the center portion, each of the legs including an end portion opposite the center portion and an intermediate portion disposed between the center portion and the end portion. Each of the end portions includes a pivot element, the pivot elements being coaxially aligned about a pivotal axis for pivotal connection to a rear end of the combine. Each of the intermediate portions includes a mounting element for supporting a rotatable crop residue accelerator thereon such that the crop residue accelerators will be located in side-by-side relation on the tube. Additionally, the center portion includes at least one mount for mounting a pair of crop residue deflectors in cantilever relation to the tube in position so as to extend partially around the crop residue accelerators, respectively. An advantage of the support is the simplicity of construction and strength and rigidity, the tube being bent as required to position the pivot elements and crop residue accelerators as desired or required for a particular application or capability, the bends enhancing torsional rigidity and strength. The end portions of the tube preferably have an outer cylindrical shape and are axially aligned to serve as the pivot elements. And, the crop residue deflectors function to guide flows of crop residue as they are accelerated and discharged from the spreader by the accelerators, the cantilever mounting providing the sole attachment of the deflectors to the spreader, such that no location is present for crop residue to snag or hairpin and form clogs or clumps. Preferably, the legs of the tube are angularly related forming a V-shape, and the tube is a unitary member, and the deflectors are mounted and supported in back-to-back relation for enhanced strength and resistance to bending.

According to another preferred aspect of the invention, the spreader is pivotally movable between at least one spreading position wherein the spreader is located rearwardly of a rearwardly facing opening of the combine for receiving at least a substantial portion of a crop residue flow discharged therethrough, and at least one second or additional position wherein the spreader is located beneath the rearwardly facing opening in a position such that a substantial portion of the residue flow discharged through the opening will bypass the spreader. This allows the residue discharged through the opening, as well as straw discharged through a space thereabove to be deposited directly onto the field behind the combine, forming a windrow. Additionally, in the second or additional position, the spreader is located so as to allow easy and direct access to the rearwardly facing opening and the space thereabove, for inspection, service, and maintenance purposes. The spreader can be retained in the spreading position using any suitable means, such as pins, detents, locks, and the like, and can be held in the other or non-spreading position by gravity, as desired.

DETAILED DESCRIPTION OF THE INVENTION

Figure 1:
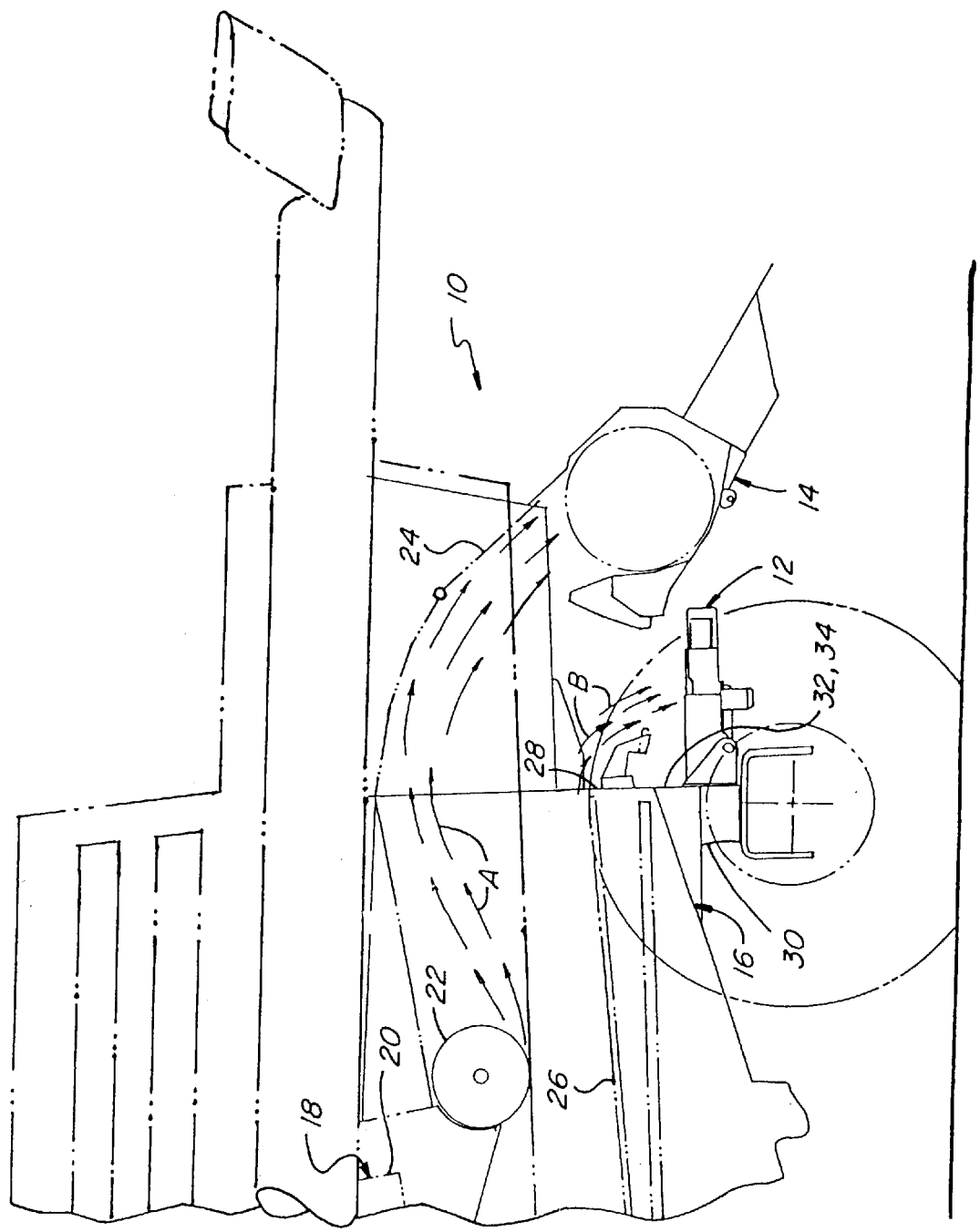
FIG. 1 is a simplified fragmentary side elevational view of an agricultural combine including a crop residue spreader according to the present invention shown in a spreading position.

Referring now to FIG. 1 of the drawings, an agricultural combine 10 representative of a wide variety of agricultural harvesting machines is shown. Combine 10 includes a crop residue spreader 12 constructed and operable according to the present invention, shown in a spreading position in association with a straw chopper 14 on a rear end 16 of combine 10 as will be explained. Combine 10 is constructed and operable in the well known manner and includes a threshing mechanism 18 including a rotor 20 rotatable for separating straw stalks, corn cobs, and other plant residue from the harvested crop, and a beater 22 rotatable for propelling or directing the flow of straw and other residue rearwardly along a flow path, denoted by arrows A, as is also well known in the art. The vertical or near vertical downward terminal end of the trajectory or flow path A is partly the result of gravity and also deflection of the flow by a deflector panel 24 located upstream and above spreader 12, and is optionally adjustable by moving or changing the angle of deflector panel 24, as will also be explained. Combine 10 includes cleaning apparatus 26 for receiving the harvested crop from threshing mechanism 18 and removing chaff and any other remaining additional residue including seed pods and husks and the like from the grain and directing a flow of the chaff and additional residue rearwardly, as indicated by arrows B, through a rearwardly facing rear opening 28. Cleaning apparatus 26 is supported by a rear frame portion 30, including first and second side portions 32, 34 adjacent opposite sides of opening 28.

Figure 2:
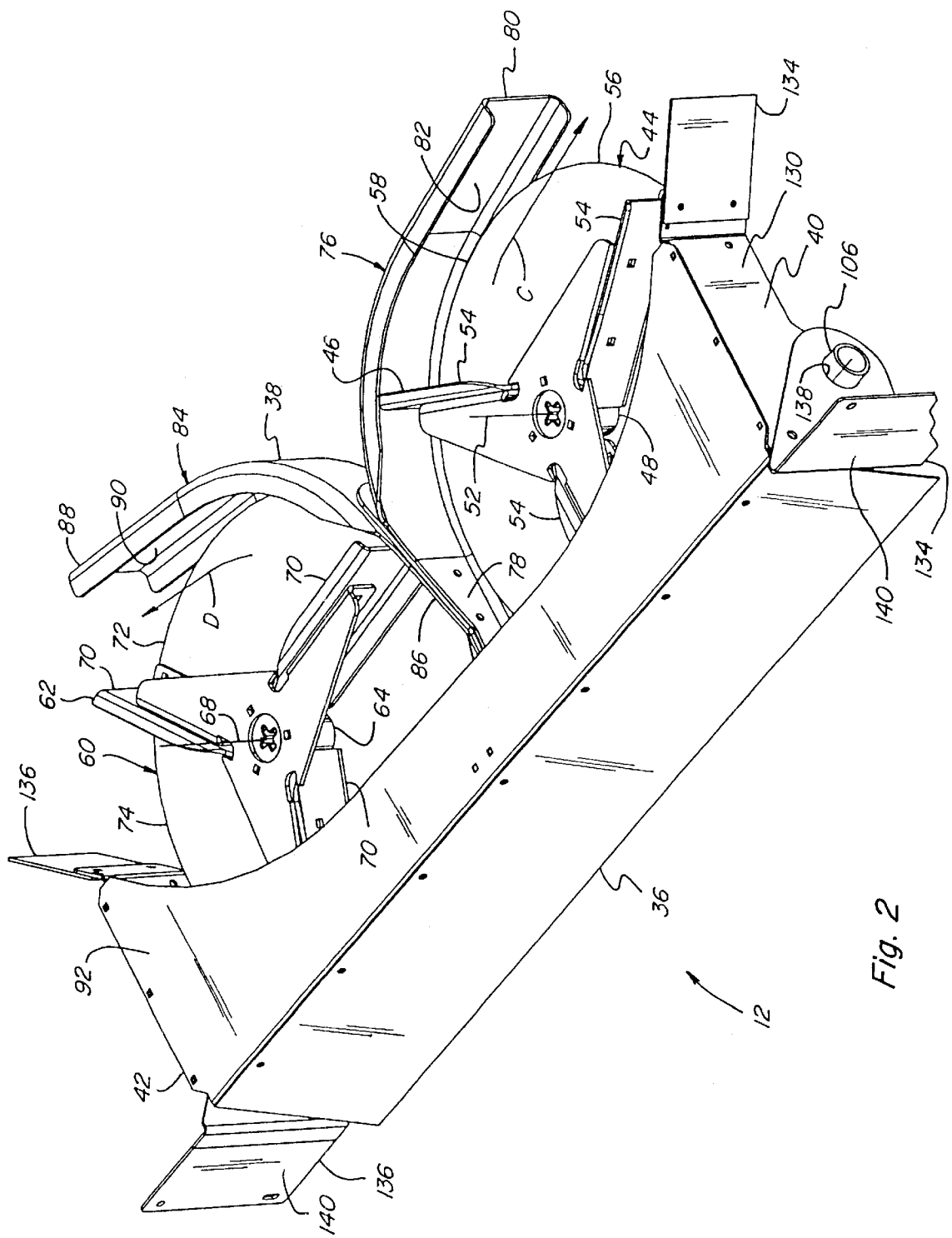
FIG. 2 is an enlarged perspective view of the spreader of FIG. 1.
Figure 3:
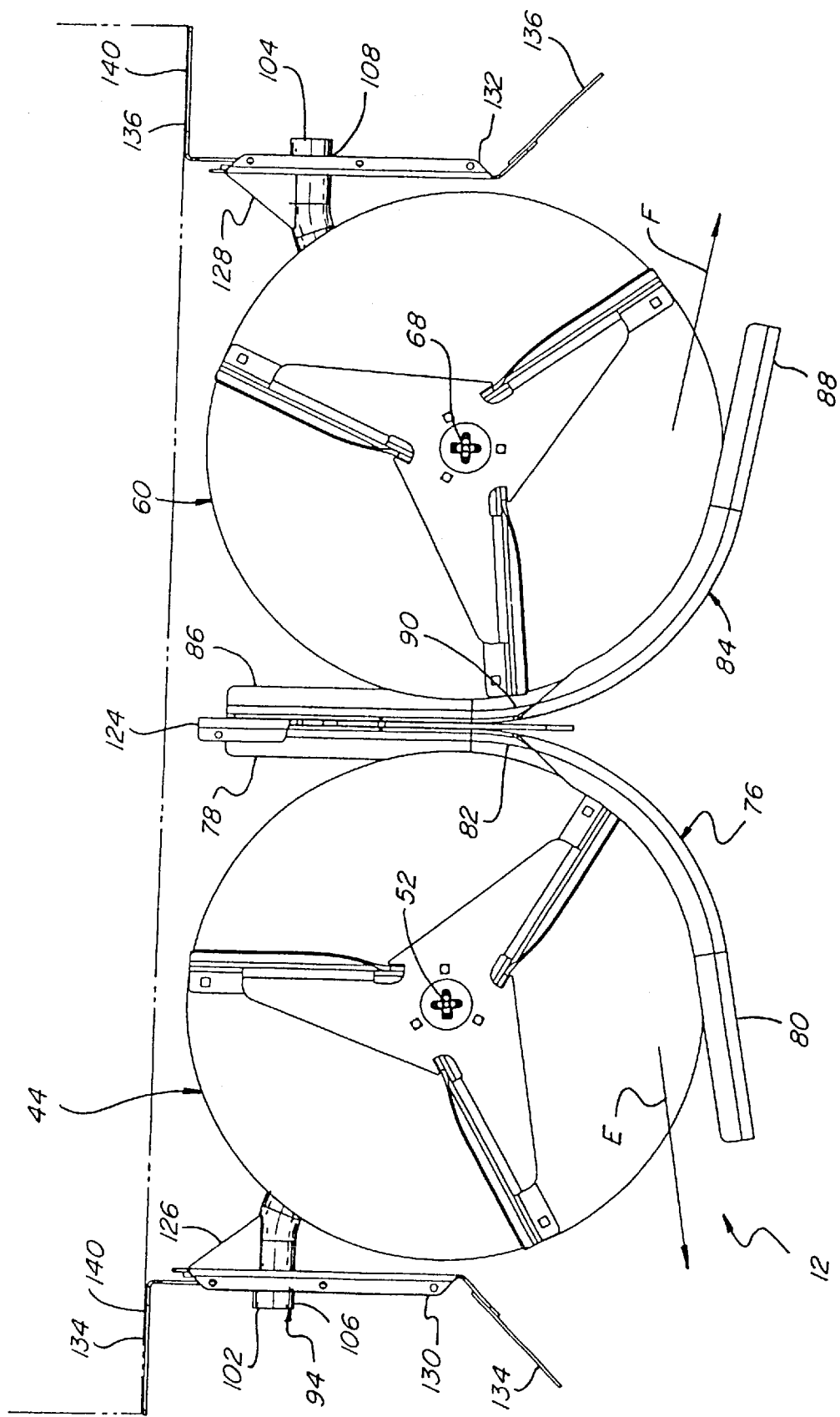
FIG. 3 is a top view of the spreader.

Referring also to FIGS. 2 and 3, spreader 12 has a forward end 36, a rearward end 38 opposite forward end 36, and opposite sides 40, 42 extending between ends 36 and 38. Spreader 12 includes a first rotary crop accelerator 44 including a rotatable element 46 mounted for rotation on a shaft 48 of a hydraulic or other motor 50, for rotation in a predetermined direction, denoted by arrow C, about a rotational axis 52. Rotatable element 46 includes a plurality of radially outwardly extending blades 54 supported by or in support of, a disk 56 which encircles and defines a outer radial periphery 58 of rotatable element 46. Spreader 12 includes a second rotary crop accelerator 60, including a second rotatable element 62 mounted on a shaft 64 of a second hydraulic or other motor 66, for rotation in a second predetermined direction, denoted by arrow D, about a second rotational axis 68. Second rotatable element 62 includes a plurality of blades 70 extending radially outwardly from shaft 64 at angularly spaced locations therearound, and connected to a disk 72 extending around and defining a outer radial periphery 74 of element 62.

Spreader 12 includes a first arcuate crop residue deflector 76 having a first end 78, a second end 80 opposite first end 78, and a radially inwardly facing arcuate or curved surface portion 82 extending between ends 78 and 80. Similarly, spreader 12 includes a second arcuate crop residue deflector 84 having a first end 86, a second end 88 opposite first end 86, and a radially inwardly facing arcuate or curved surface portion 90 extending between ends 86 and 88. When viewed from the first or second end, each of deflectors 76 and 84 preferably has a channel or U-shape cross-section as best shown in FIG. 2. Spreader 12 additionally includes a shield 92 on forward end 36 and in partially covering relation to forward portions of first and second rotary crop accelerators 44 and 60 (shown removed in FIG. 3).

Figure 4:
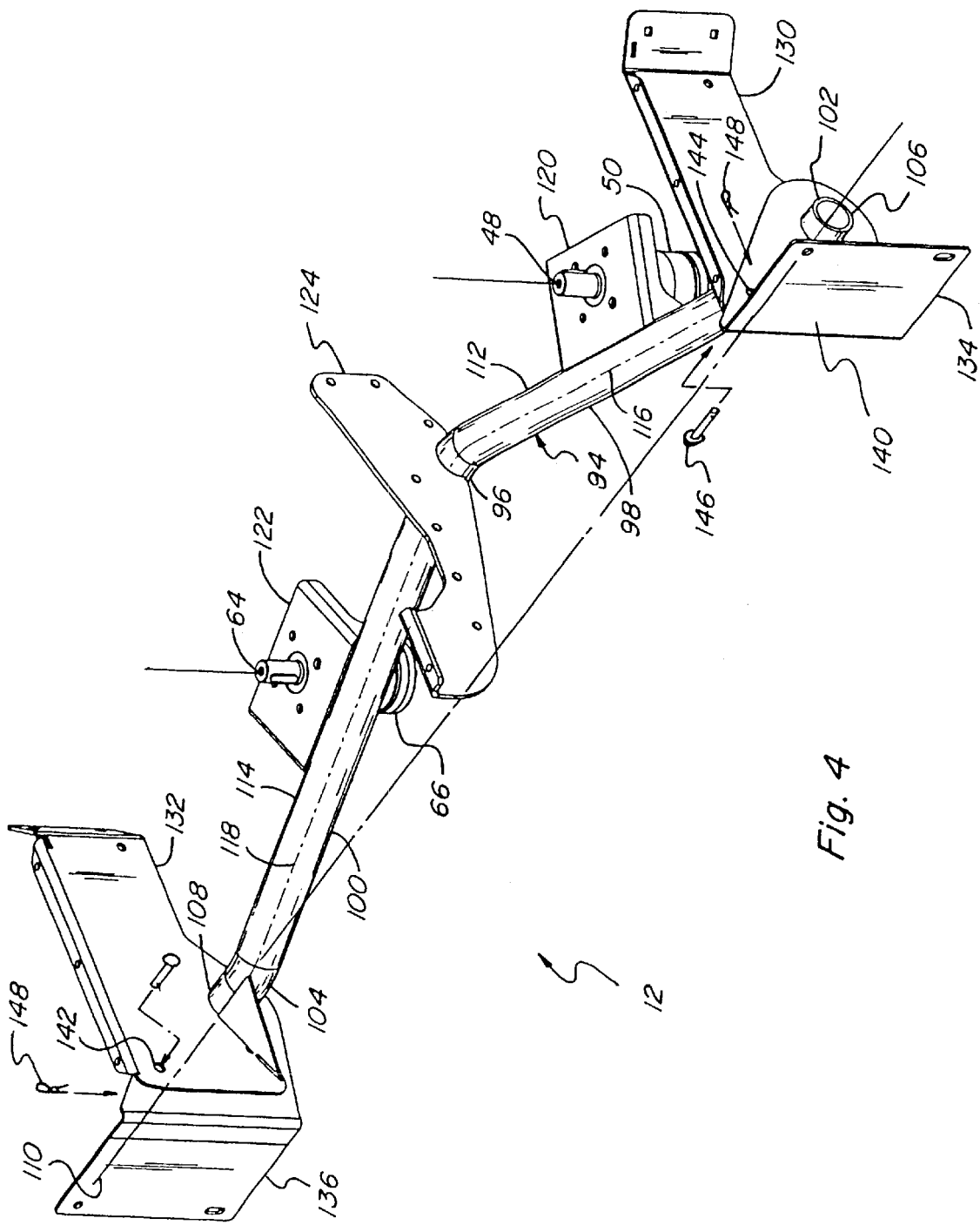
FIG. 4 is a perspective view of a tubular support element and other elements of the spreader.

Referring also to FIG. 4, spreader 12 importantly includes an elongate tubular support element 94 which is preferably a unitary tube, including a center portion 96 and a pair of legs 98, 100 extending outwardly in opposite from directions from center portion 96. Legs 98, 100 include end portions 102 and 104, respectively, opposite center portion 96. End portions 102, 104 include pivot elements 106 and 108, respectively, axially aligned about a pivotal axis 110 extending therethrough, for pivotal connection of spreader 12 to side portions 32 and 34 or another convenient portion of rear frame portion 30 of combine 10. Legs 98 and 100 additionally include intermediate portions 112 and 114, respectively, which are angularly related to one another about center portion 96, so as to form a V-shape, as best shown in FIG. 4. Intermediate portions 112 and 114 have longitudinal axes 116 and 118 extending therethrough, respectively, axes 116 and 118 preferably being at least generally coplanar with pivotal axis 110. Intermediate portions 112 and 114 include mounting elements 120 and 122 mounted thereon, respectively, for supporting first and second rotary crop accelerators 44 and 60 in side-by-side relation on support element 94; as best shown in FIGS. 2 and 3. Essentially, each mounting element 120, 122 includes a plate fixedly connected to intermediate portion 112 or 114 by welding, fasteners or other suitable attachment, motors 50 and 66 being mounted on mounting element 120, 122, respectively, using fasteners such as screws or bolts, and the rotatable element 46, 62 being mounted to shaft 48 or 64 of the motor 50, 66, respectively, for rotation therewith. The V-shape of the intermediate portions 112, 114 about central portion 96 positions rotary crop accelerators 44, 60 to one side of pivotal axis 110, and enables both crop accelerators 44 and 60 to be simply mounted on a single support element. Additionally, center portion 96 includes a mount 124 extending outwardly therefrom, for mounting first and second arcuate crop residue deflectors 76 and 84 to tubular support element 94.

Figure 5:
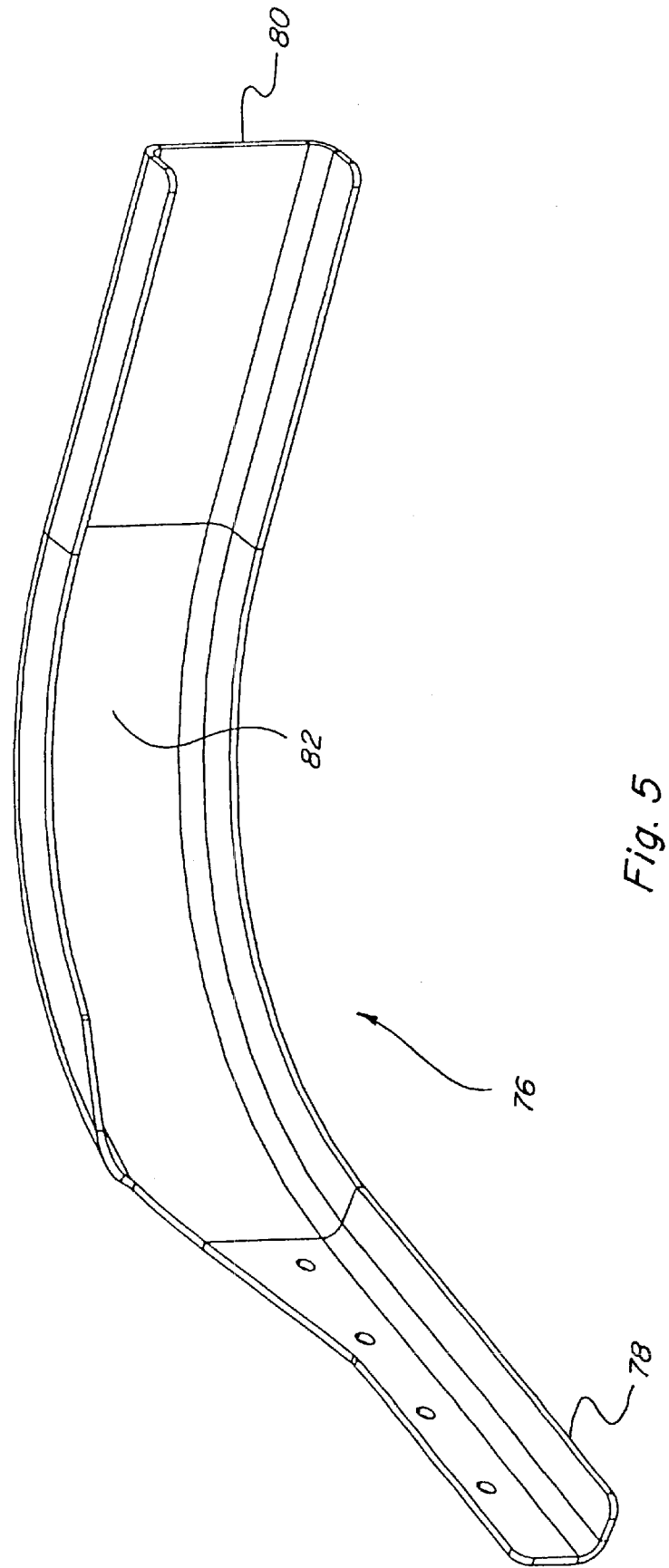
FIG. 5 is an enlarged perspective view of a crop residue deflector of the spreader.

Referring also to FIG. 5, each crop residue deflector 76, 84, as represented by deflector 76, is adapted to be connected by first end 78 or 86 to mount 124 so as to be supported in cantilever relation to support element 94. Deflectors 76 and 84 can be connected to mount 124 using any suitable fasteners, such as bolts, screws or the like using the holes in first end 78 shown, or by welding, or any other suitable attachment. Preferably, first ends 78 and 86 are connected in back-to-back relation to mount 124, so as to be stiffened and strengthened by each other. Referring more particularly to FIG. 3, mount 124 is located at a predetermined angular position about rotational axes 52, 68, to position first ends 78 and 86 of deflectors 76 and 84 at that position, and such that second ends 80 and 88 are located at second angular positions about axes 52 and 68, respectively, for guiding crop residue received and carried and accelerated by accelerators 44 and 60 along predetermined paths, defined by surface portions 82 and 90 of the deflectors, so as to be discharged from spreader 12 along opposite discharge flow paths, as denoted by arrows E and F, respectively. Because deflectors 76 and 84 are supported in cantilever relation, and smoothly extend to second ends 80 and 88 thereof, respectively, there is no location thereon for crop residue to snag and/or collect on the deflectors so as to form clumps when eventually freed, or clog the crop accelerator, or interfere with the smooth distribution of crop residue thereby. Also, because crop accelerators 44 and 60 and deflectors 76 and 84 are supported solely on and by tubular support element 94, there is no significant location for deposition and collection of crop residue which could later fall onto a field in a clump, or interfere with operation of spreader 12, and require manual removal.

As an additional feature in this regard, end portions 102, 104 of tubular support element 94 include brackets 126 and 128, respectively, fixedly mounted thereon for pivotal movement therewith, adapted for supporting shield 92 in covering relation to forward end 36 of spreader 12, and in partially covering relation to the forward ends of crop accelerators 44 and 60 (as best shown in FIG. 2). Brackets 126 and 128 additionally include side walls 130 and 132 fixedly mounted thereon and extending rearwardly therefrom which are positioned to abut or connect to and support shield 92 in the position shown in FIG. 2. Side walls 130 and 132 include deflectors 134 and 136, respectively, angularly oriented with respect thereto and with respect to deflectors 76 and 84, respectively, for additionally providing guidance and control for accelerated flows of crop residue discharged from spreader 12. Referring more particularly to FIG. 2, as a result of the mounting and support of shield 92 by brackets 126 and 128 adjacent covered regions of crop accelerators 44 and 60, and because no bottom enclosure is provided, there is no location for crop residue to collect in significant quantities beneath shield 92.

Referring also more particularly to FIGS. 3 and 4, as discussed above, pivot elements 106 and 108 on ends portions 102 and 104, respectively, comprise cylindrical elements, which are most preferably sections of tubular support element 94 aligned so as to be coaxial along pivot axis 110, such that the cylindrical outer surfaces thereof serve as the support and bearing surfaces for spreader 12. Pivot elements 106 and 108 are pivotally supportable using any suitable members, such as L-shaped brackets 134 and 136 each including a hole 138 therethrough for receiving pivot element 106 or 108 for rotation therein, and a plate or other element 140 mountable to one of the side portions 32 or 34 of rear frame portion 30 of combine 10, using bolts, other fasteners, welding, or other means of attachment. Thus, it can be seen that by utilizing a single, unitary tubular support element 94, and bending the tubular member at center portion 96 and at end portions 102 and 104, and attaching mounting elements 120 and 122 thereto for supporting rotary crop accelerators 44 and 60, and by attaching mount 124 and brackets 126 and 128 to the tubular element, an effective, strong and rigid yet simple support structure for spreader 12 is achieved, which is economical, and allows flow of crop residue thereby, without undesirable accumulation of the residue on the support structure. The curved upper surface of tubular support element 94 facilitates passage of crop residue thereby, due to the lack of a place on the element for holding or retaining the residue, such that residue that leaks or passes below crop accelerators 44 and 60 will fall to the ground and not clump or otherwise build up or cause other problems.

Figure 6:
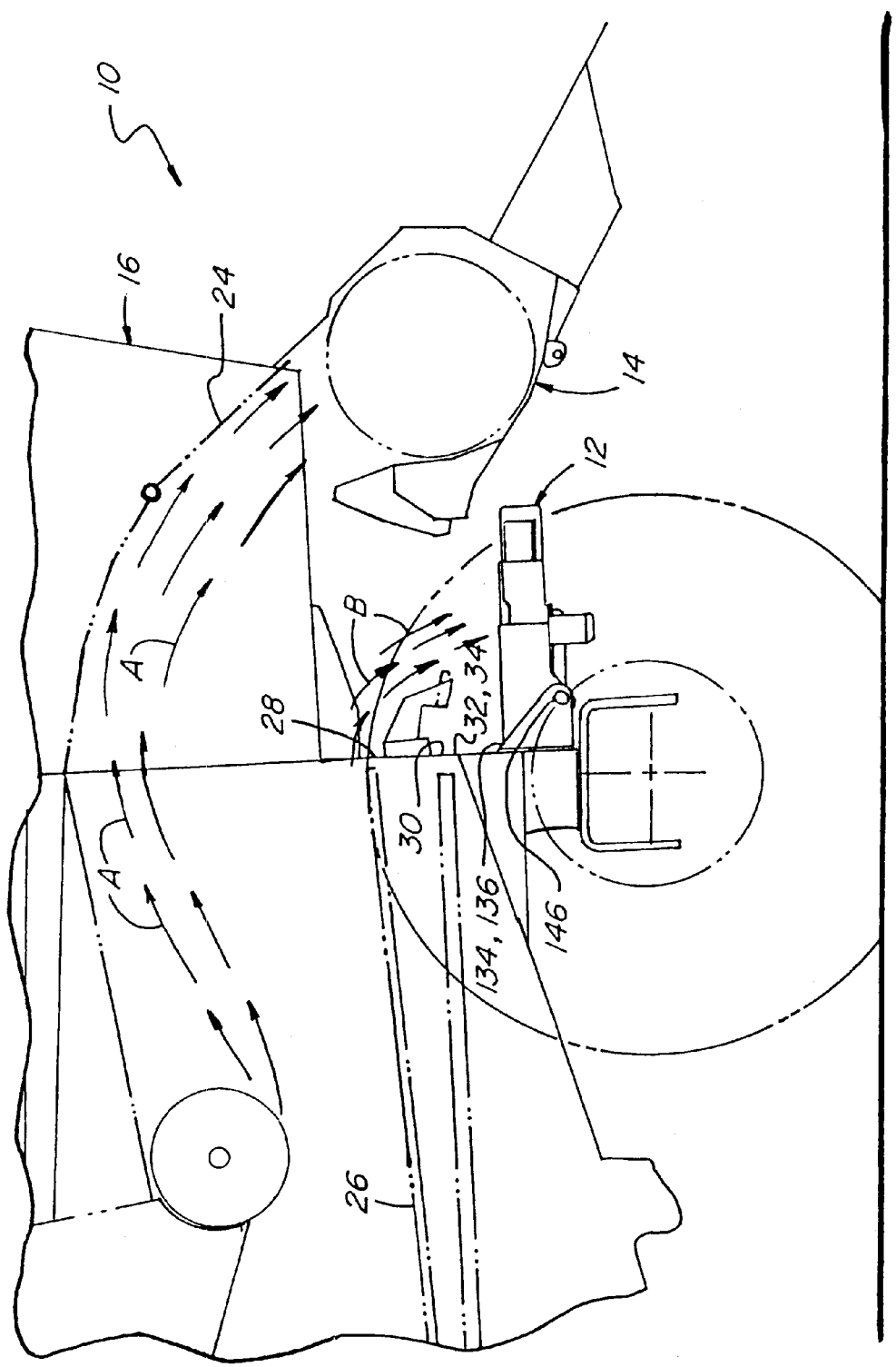
FIG. 6 is an enlarged side view of the combine and spreader in a straw chopping configuration.
Figure 7:
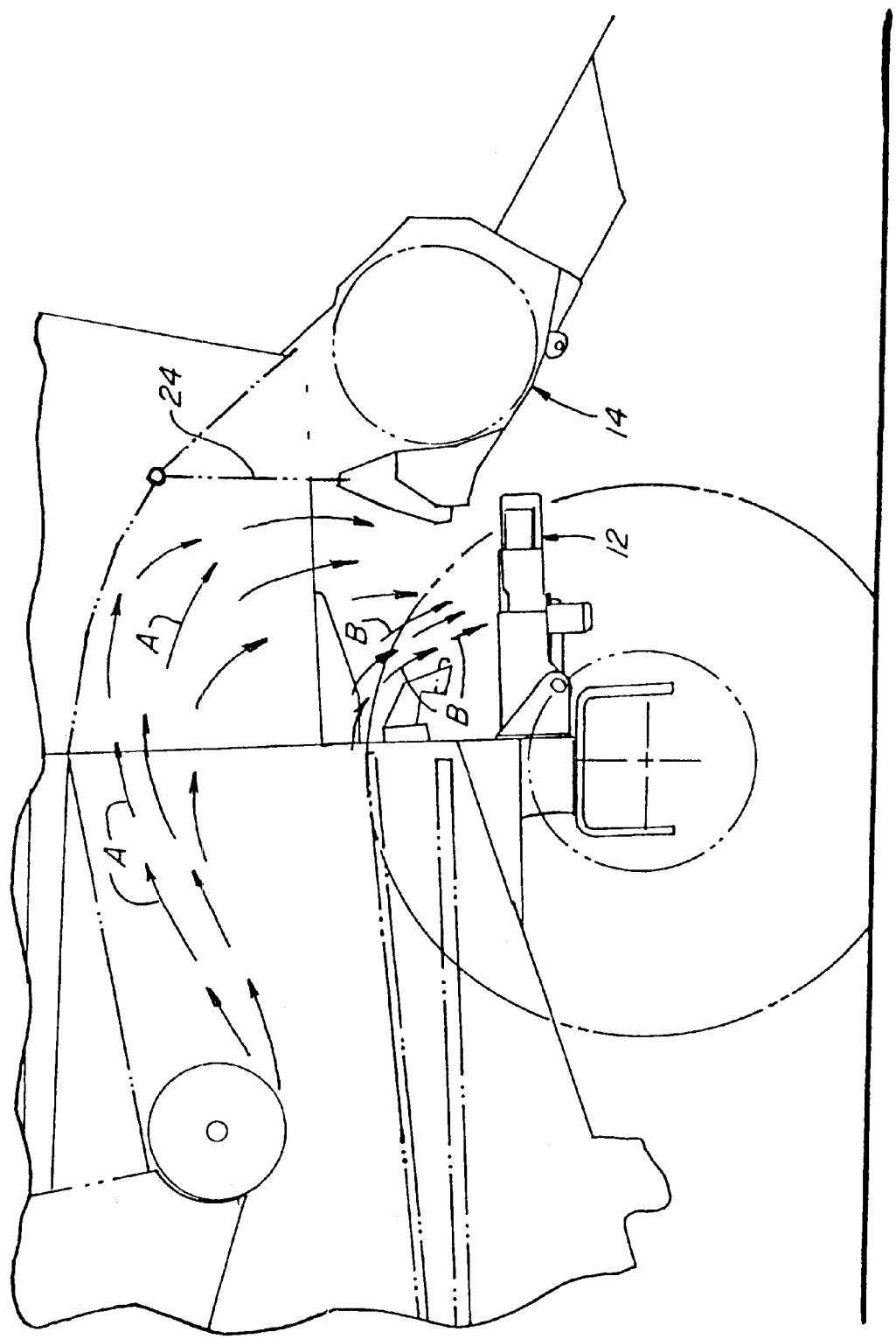
FIG. 7 is another enlarged side view of the combine and spreader, in a straw spreading configuration.

Brackets 126 and 128 fixedly supported on tubular support element 94 each include holes 142 which are aligned with corresponding holes 144 through L-shape brackets 134 and 136, respectively, when spreader 12 is in a horizontal position as shown in FIGS. 1, 6 and 7, for removably receiving a pin 146 for holding spreader 12 in the horizontal position as illustrated in FIG. 4. Pins 146 are retained by retainer clips 148, and are removable from holes 142 and 144, as desired, to allow spreader 12 to pivot about pivotal axis 110 to an alternative position, such as, but not limited to a more vertical position, as shown in FIG. 8.

Referring more particularly to FIG. 6, spreader 12 is shown in a substantial horizontal spreading position supported by L-shaped brackets 134, 136, which are mounted on side portions 32 and 34 of rear frame portion 30 of rear end 16 of combine 10. Spreader 12 is held in this position by pins 146, as described above. In this position, spreader 12 is located rearwardly of cleaning apparatus 26 beneath rearwardly facing opening 28 such that crop residue discharged through opening 28 from cleaning apparatus 26 will be received in the upwardly open portions of spreader 12, so as to be accelerated by rotary crop accelerators 44 and 60, and expelled or discharged from spreader 12 in opposite sideward directions. In FIG. 6, deflector panel 24 is shown in an open position, allowing straw from threshing mechanism 18 (FIG. 1) as denoted by arrows A to enter chopper 14 so as to be chopped thereby and discharged from combine 10.

Referring also to FIG. 7, by moving deflector panel 24 to a closed position to thereby prevent the straw flow to enter chopper 14, the flow of straw A will be deflected by panel 24 downwardly and into spreader 12 so as to be accelerated and discharged sidewardly thereby. In some instances, particularly when the straw contains corn cobs, this is advantageous, as spreader 12 does not chop or cut the cobs, so as to avoid wear and damage problems. The cobs and other straw will mix with chaff which enters spreader 12, as denoted by arrows B, so as to be substantially evenly distributed over the swath of combine 10.

Figure 8:
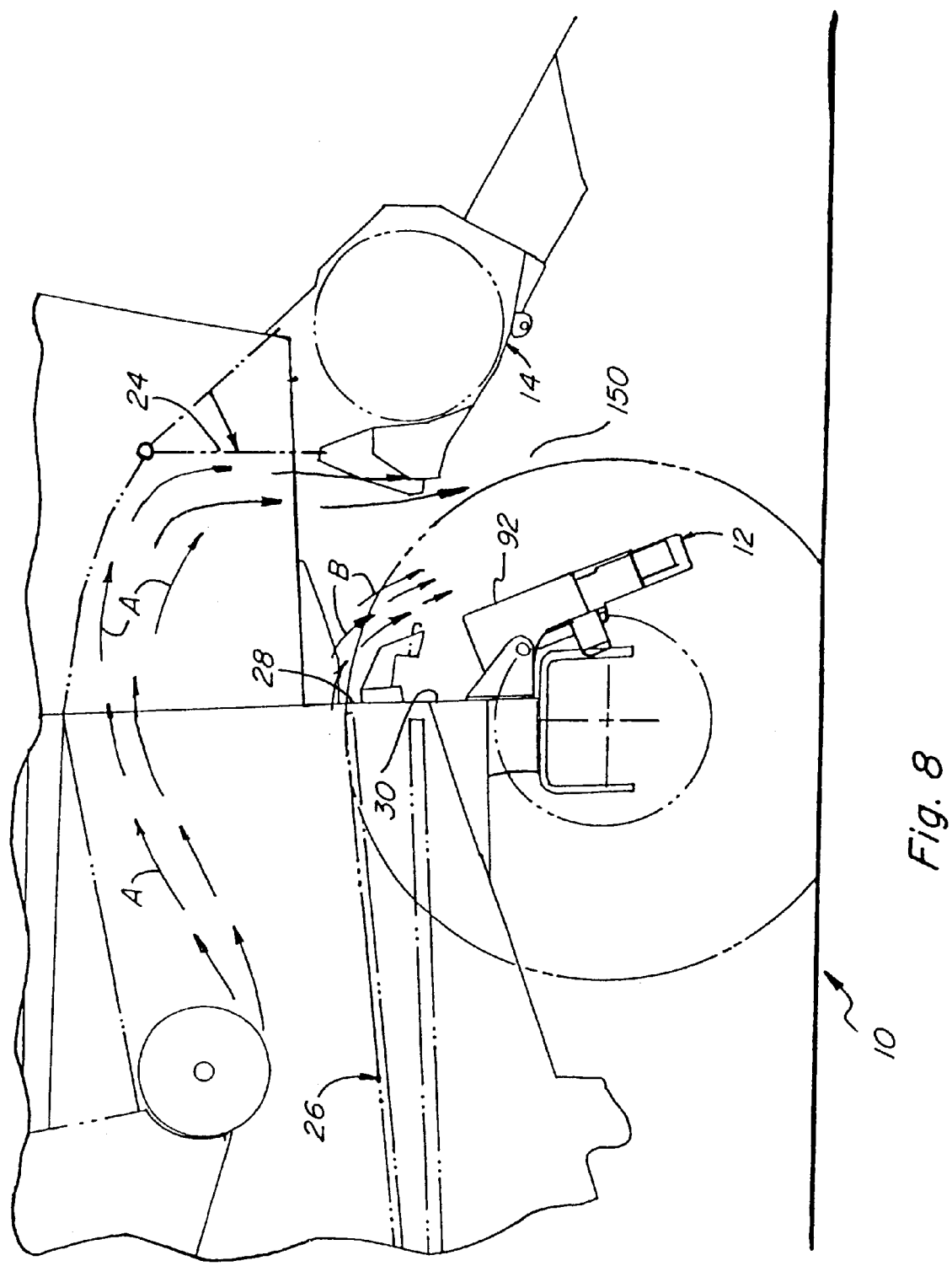
FIG. 8 is another fragmentary side view of the combine and spreader, in a chaff spreading and straw windrowing configuration, the position of the spreader also allowing access to cleaning apparatus and other rearward internal aspects of the combine.

In FIG. 8, spreader 12 is shown positioned in a second position below rearwardly facing opening 28 and oriented at a small acute angle to vertical, and deflector panel 24 is still in the closed position, such that the flow of straw A can be discharged from combine 10 through a downwardly facing space 150 between rear frame portion 30 and straw chopper 14 to form a windrow, while the flow of crop B residue discharged through opening 28 can fall onto shield 92 or otherwise bypass spreader 12 and also fall onto the field behind combine 10. With spreader 12 in this position, rotary crop accelerators 44 and 60 of spreader 12 are preferably turned off.

It should be noted that spreader 12 can be positioned in alternative positions between the generally horizontal position shown in FIGS. 1, 6, and 7, and the more vertical position shown in FIG. 8, as desired or required for a particular application. In further reference to FIG. 8, it should be noted that with spreader 12 in this or a similar position, space 150 is sufficiently large for receiving the upper body portion of a person standing below space 150, for purposes including, but not limited to, accessing, inspection, adjusting, maintaining, and/or repairing cleaning apparatus 26, chopper 14, and other internal apparatus, as desired or required.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates several preferred embodiments of the invention and methods of operation of the same; however, concepts, as based upon the description, may be employed in other embodiments without departing from the scope of the invention. Accordingly, the following claims are intended to protect the invention broadly as well as in the specific form shown.

What is claimed is:

1. A crop residue spreader for an agricultural combine, the combine having a rear frame portion supporting crop cleaning apparatus operable for separating crop residue from the crop and discharging the residue through a rearwardly facing opening located rearwardly of the cleaning apparatus, the rear frame portion including first and second side portions located adjacent to opposite sides of the rear opening, the crop residue spreader comprising:

an elongate tubular support element having a first longitudinal end portion, a second longitudinal end portion opposite the first longitudinal end portion, and a generally V-shape intermediate portion having a center portion disposed about equidistant from the first and second longitudinal end portions and angularly related leg portions extending between the center portion and the first and second longitudinal end portions;

first and second pivots on the first and second longitudinal end portions for pivotally mounting the support element to the first and second side portions of the rear frame portion, respectively, for pivotal movement of the support element relative thereto about a generally horizontal pivotal axis extending through the pivots;

a first rotary crop residue accelerator mounted to the first leg portion of the support element intermediate the center portion and the first longitudinal end portion, including a first rotatable element for rotation relative to the support element about a first rotational axis;

a second crop residue accelerating unit mounted to the second leg portion of the support element intermediate the center portion and the second longitudinal end portion, including a second rotatable element for rotation relative to the support element about a second rotational axis;

a first arcuate crop residue deflector having a first end mounted to the center portion of the support element supporting the first deflector in cantilever relation thereto around a portion of an outer radial periphery of the first rotatable element; and a second arcuate crop residue deflector having a first end mounted to the center of the support element supporting the second deflector in cantilever relation thereto around a portion of an outer radial periphery of the second rotatable element.

2. The crop residue spreader of claim 1, wherein the tubular support element comprises a unitary tube having at least one bend therein defining the generally V-shape intermediate portion.

3. The crop residue spreader of claim 2, wherein the first and second pivots comprise outer cylindrical surfaces of the longitudinal end portions of the unitary tube, respectively.

4. The crop residue spreader of claim 3, wherein the tube includes bends which orient the outer cylindrical surfaces in coaxial relation to the pivotal axis, respectively.

5. The crop residue spreader of claim 1, further comprising brackets mounted to the support element supporting a shield positioned in partial covering relation to the first and second rotary crop residue accelerators.

6. The crop residue spreader of claim 1, wherein the first ends of the first and second crop residue deflectors are connected together.

7. The crop residue spreader of claim 1, wherein the first and second rotatable elements are rotatable in opposite rotational directions about the first and second rotational axes, respectively, and the first arcuate crop residue deflector extends from the first end thereof in the first rotational direction around the outer radial periphery of the first rotatable element and terminates at a second end angularly spaced from the center portion of the support element about the first rotational axis, and the second arcuate crop residue deflector extends from the first end thereof in the second rotational direction around the outer radial periphery of the second rotatable element and terminates at a second end angularly spaced from the center portion of the support element about the second rotational axis.

8. The crop residue spreader of claim 7, wherein the first ends of the first and second arcuate crop residue deflectors are jointly mounted to the center of the support element.

9. In a crop residue spreader for an agricultural combine, the spreader including a structural element supporting at least one rotary crop residue accelerator rotatable in a predetermined direction about a rotational axis for receiving a flow of the crop residue and accelerating and discharging the flow of residue in a predetermined direction from the spreader, the improvement comprising a crop residue deflector having a first end connected to the structural element adjacent to a radial periphery of the crop residue accelerator at a predetermined first angular position about the rotational axis, a second end spaced radially outwardly of the crop residue accelerator at a predetermined second angular position about the rotational axis spaced in the predetermined direction from the first angular position, and a smooth, curved surface extending between the first and second ends and facing the radial periphery of the crop residue accelerator, the connection of the first end to the structural element being the only attachment of the deflector to the spreader such that the deflector is supported by the first end in cantilever relation to the structural element.

10. The spreader of claim 9, wherein the deflector has a generally U-shape cross section when viewed from either of the ends thereof.

11. The spreader of claim 9, wherein the structural element supports a second rotary crop residue accelerator rotatable in a predetermined direction about a second rotational axis for receiving a portion of the flow of the crop residue and accelerating and discharging the portion of the flow of residue in a second predetermined direction from the spreader, the improvement further comprising a second crop residue deflector having a first end connected to the structural element adjacent to an outer radial periphery of the second rotary crop accelerator at a predetermined angular position about the second rotational axis, a second end spaced radially outwardly of the second crop residue accelerator at a predetermined second angular position about the second rotational axis spaced in the second predetermined direction from the first angular position, and a smooth, curved surface extending between the first and second ends of the second crop residue deflector and facing the outer radial periphery of the second crop residue accelerator, the connection of the first end of the second crop residue deflector to the structural element being the only attachment of the second deflector to the spreader such that the second deflector is supported by the first end thereof in cantilever relation to the structural element.

12. The spreader of claim 11, wherein the first ends of the deflectors are jointly connected to the structural element.

13. The spreader of claim 9, wherein the improvement further includes the structural element comprising an elongate tube which solely supports the rotary crop residue accelerators.

14. In a crop residue spreader for an agricultural combine, the combine having a rear frame portion supporting crop cleaning apparatus operable for separating crop residue from the crop and discharging the residue through a rearwardly facing opening located rearwardly of the cleaning apparatus, the rear frame portion including first and second side portions located adjacent to opposite sides of the rear opening, and the crop residue spreader including at least one rotary crop residue accelerator rotatable about a rotational axis for receiving a flow of the crop residue discharged through the opening and accelerating the residue and discharging the residue outwardly from the rear end of the combine, the improvement comprising:

mounting apparatus for the spreader including pivots for attachment of the spreader to the first and second side portions of the rear frame of the combine, respectively, for pivotal movement of the spreader, about a generally horizontal axis between at least one spreading position wherein the spreader is located rearwardly of the rearwardly facing opening for receiving at least a substantial portion of the crop residue discharged therethrough, the rotational axis of the at least one rotary crop accelerator is oriented generally vertically or at a small acute angle to vertical and at least one second position wherein the rotational axis is oriented generally horizontally or at a small acute angle to horizontal and the spreader is located beneath the rearwardly facing opening.

15. In the crop residue spreader of claim 14, the combine further comprising a duct and a downwardly facing open space located above and rearwardly of the rearwardly facing opening for carrying a flow of straw rearwardly for discharge through the downwardly facing open space, the duct including a movable panel positionable in a first position for directing the flow of straw downwardly along a first path through the space just rearwardly of the rearwardly facing opening and the spreader when in the second position, and a second position for directing the flow of straw along a second path into a straw chopper mounted on the combine rearwardly of the space, the improvement further including the spreader when in the at least one spreading position being positioned at least partially in the first path for receiving at least a portion of the downwardly directed flow of straw when the panel is in the first position, and the spreader when in the at least one second position being located at least substantially forwardly of the first path such that the downwardly directed flow of straw can pass through the space for forming a windrow on a surface beneath the space.

* * * * *